United States Patent [19]
Kilgore

[11] Patent Number: 5,775,252
[45] Date of Patent: Jul. 7, 1998

[54] TACTILE DIAL

[76] Inventor: Gary Hartman Kilgore, 239 Calumet Pl., San Antonio, Tex. 78209

[21] Appl. No.: 811,193

[22] Filed: Mar. 5, 1997

[51] Int. Cl.$^6$ .......................... G01C 13/18; G09B 21/00; E05B 17/00
[52] U.S. Cl. .................. 116/205; 116/309; 116/DIG. 17; 70/438; 70/445; 434/113
[58] Field of Search .......................... 116/205, DIG. 17, 116/284, 298, 300, 308, 309, 317; 70/330, 332, 438, 445; 434/113; 33/270, 792, 797; 74/553, 557

[56] References Cited

U.S. PATENT DOCUMENTS

| | | | |
|---|---|---|---|
| 901,972 | 10/1908 | Kone | 70/330 |
| 1,238,247 | 8/1917 | Baker et al. | 70/330 |
| 1,575,848 | 3/1926 | Laubach | 74/557 |
| 2,208,366 | 7/1940 | Hamilton | 116/DIG. 70 |
| 2,339,013 | 1/1944 | Higgins | 74/557 |
| 2,371,325 | 3/1945 | Wessborg | 434/113 |
| 3,473,352 | 10/1969 | Foote | |
| 3,536,017 | 10/1970 | Lucas | |
| 4,104,896 | 8/1978 | Hahn | |
| 4,197,726 | 4/1980 | Uyeda | |
| 4,445,348 | 5/1984 | Saitoh | |
| 4,476,698 | 10/1984 | Treslo | |
| 4,615,191 | 10/1986 | Grandy | |

*Primary Examiner*—Thomas B. Will
*Assistant Examiner*—Andrew Hirshfield

[57] ABSTRACT

A disk shaped element has a plurality of tactile sensed position indicators arranged along its' circumference. Each position indicator consists of a straight bar terminated at one end with a rod having a diameter greater than the thickness of the corresponding bar. Each bar extends outwardly from the circumference of the disk, and each rod extends outwardly from the circumference a distance greater than the corresponding bar. Each position indicator on the dial is oriented analogous to an hour hand position on a clock, with the rod providing a reference for the base of the hand.

1 Claim, 4 Drawing Sheets

TACTILE DIAL

BACKGROUND OF THE INVENTION

There are a great many economical and clever locking mechanisms on the market. However, I have yet to find a suitable solution to a common lock problem. Frequently, locks, particularly padlocks, are used in locations where visibility is poor. For instance, a gate, chain, or shed door that is accessed at night. And just as frequently, these locks are opened by those of us among the population who have passed well beyond the age of majority, and well, our eyes aren't so good anymore. Several years ago, I watched one of my brother-in-laws struggling with a dial combination padlock. About half way through the fight, he looked up a little desperate and said, I need a lock with braille on it. I thought about the many times I had held a ring of padlock keys up in the headlights and strained to read the numbers scratched on each key. It hit me that there is definitely a market for a lock that can be opened by touch alone. However, no one is going to learn braille, simply to operate a padlock on their back gate. The position indicators along the dial have to correspond to something that the public is already familiar with. The positions of the hands of a clock fit this need quite well: the clock hand is a straight line, this is important because different orientations of a straight line are the easiest symbols to recognize by touch; and everyone is familiar and comfortable with reading a clock. So without ever having seen a lock with tactile dials, if you and I drove up to a gate, and you jumped out of the truck to open the gate, and I told you the combination is: 3 (o'clock) - 12 - 8 - 4, you can visualize how each dial should feel to be in the right position.

SUMMARY OF THE INVENTION

A tactile dial of the present invention provides a lock operating mechanism for poor visibility conditions. Installed in series in a combination lock, tactile dials allow for lock disengagement in conditions where visual referencing of the dial positions is not practical. Whereas, a numerical combination dial has numbers along its circumference, a tactile dial has bars along its circumference. Each bar corresponds to a hand position on a clock. Each bar is terminated on one end by a rod that rises higher from the surface than the bar. Thus, a finger can judge the difference between a bar pointing to 3 and a bar pointing to 9.

DESCRIPTION OF THE PREFERRED EMBODIMENT

Figure 1:
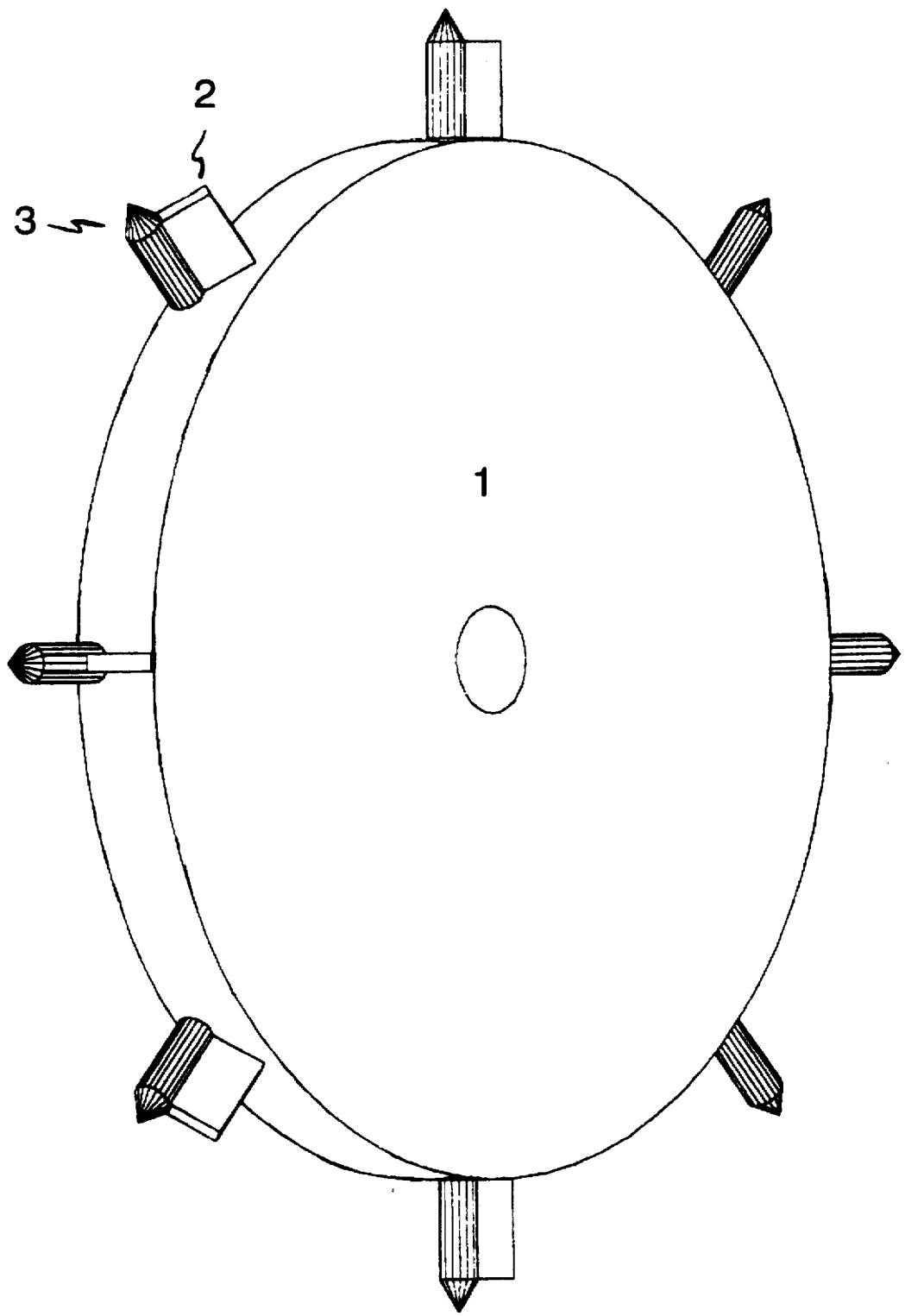
FIG. 1 is a perspective view of a tactile dial of the present invention.
Figure 2:
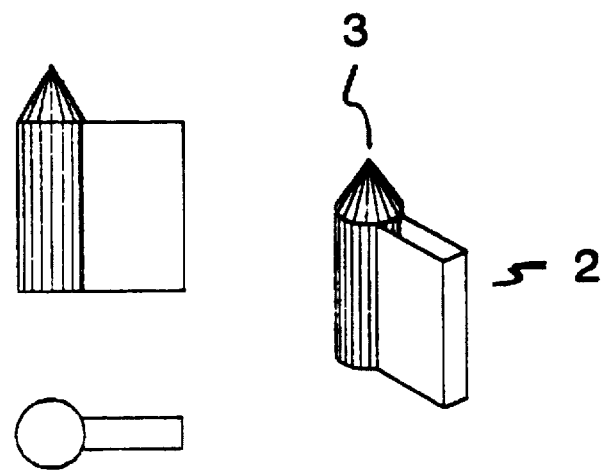
FIG. 2 illustrates various views of a tactile sensed position indicating structure of the dial of FIG. 1.
Figure 3:
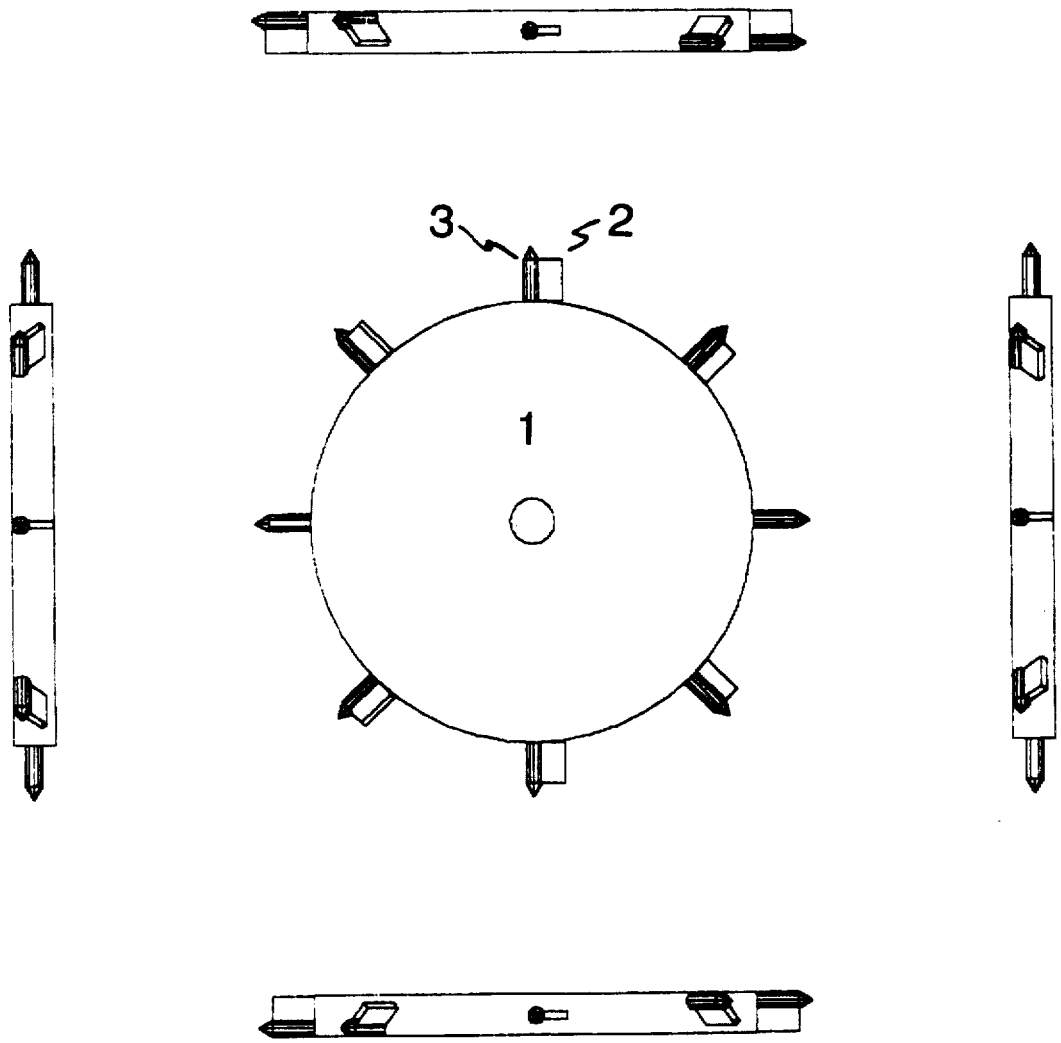
FIG. 3 illustrates five views of the tactile dial of FIG. 1.

FIG. 1 shows a dial including a disk 1 and a plurality of tactile sensing position indicating structures arranged on the circumference of the disk 1. Each indicating structure includes a rectangular bar 2 terminated on one end thereof by a rod 3. The rod 3 has a diameter greater than the thickness of the bar 2, and each of the bars 2 and the rods 3 extend outwardly from the circumference of the disk 1. The rod 3 extends outwardly a greater distance than its' corresponding bar 2, thus providing a tactile point of reference for a user of a locking mechanism including the dial as a component thereof.

Figure 4:
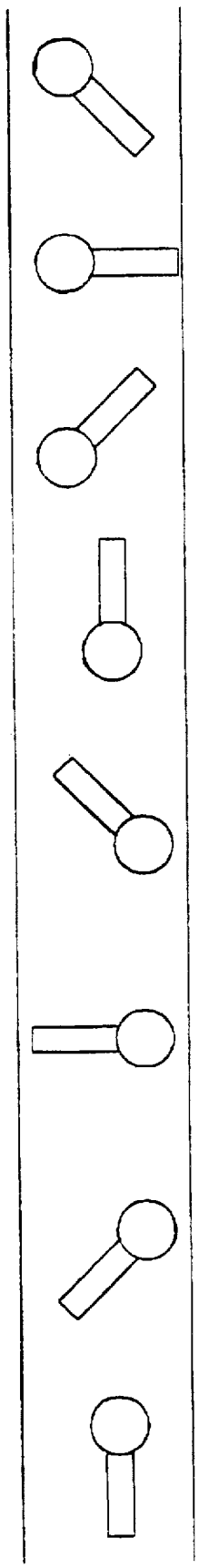
FIG. 4 illustrates the perimeter of the dial of FIG. 1, showing a comparison of each of the indicating structures.

As illustrated most clearly in FIG. 4, each position indicating structure corresponds to a distinct orientation of a hand of a clock, wherein the indicating structure corresponding to one o'clock represents the numeral "1", and the indicating structure corresponding to two o'clock represents the numeral "2", etc. Therefore, when the dial is utilized as a component in a lock, wherein it is necessary to rotate the disk 1 to open the lock, the user can feel each position indicating structure to determine the position of the disk 1 relative to the rest of the lock. The user can then rotate the disk 1 to a proper orientation for opening the lock. This enables the user to operate the lock without requiring visible observation of the lock or even knowledge of braille.

I claim:

1. A dial comprising: a disk; arranged on the circumference of said disk, a plurality of tactile sensed position indicating structures; each of said structures consisting of a bar terminated on a first end by a rod having a diameter greater than the thickness of the bar; each of said bars extending outwardly from the circumference of the disk; and each of said rods extending outwardly from the circumference of the disk, a distance greater than the bar corresponding thereto; each said position indicating structure corresponding to a different orientation of a hand of a clock.

* * * * *